Sept. 27, 1932.  1,880,171
A. KORONSKI, NOW BY JUDICIAL CHANGE OF NAME A. KING
LIQUID LEVEL INDICATOR
Filed June 4, 1923
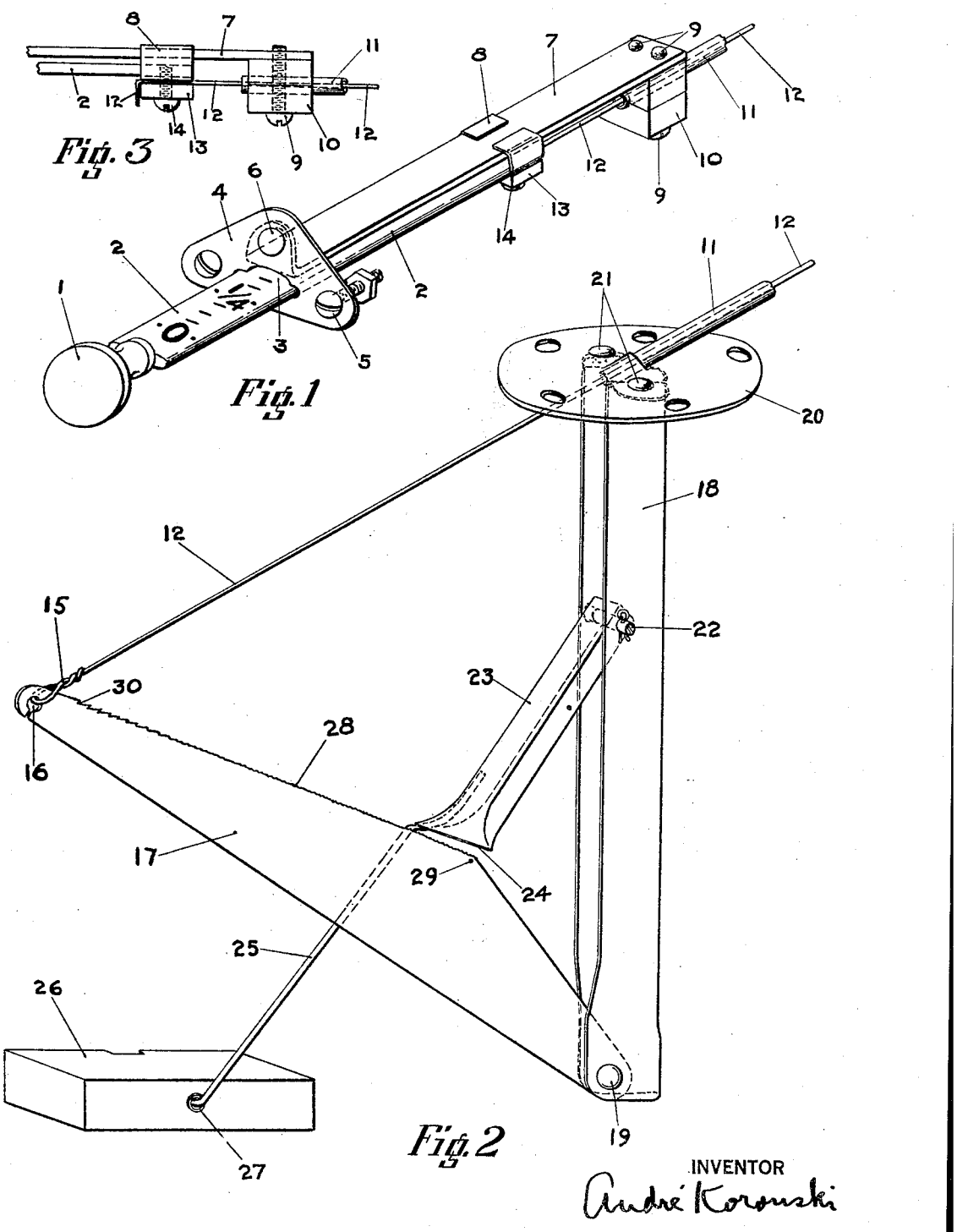
INVENTOR
André Koronski Patented Sept. 27, 1932

1,880,171

UNITED STATES PATENT OFFICE

ANDRE KORONSKI, NOW BY JUDICIAL CHANGE OF NAME ANDREW KING, OF NARBERTH, PENNSYLVANIA

LIQUID LEVEL INDICATOR

Application filed June 4, 1923. Serial No. 643,134.

My invention relates to that class of gauges which consist of two parts, one of which is located at one point, as in the tank of an automobile, and the other is located at another point, as on the dash.

One object of the invention is to provide a novel construction of gauge for ascertaining the amount of liquid in a container in which a float actuated lever within the container extends transversely of a reading lever and is adapted to limit the extent of movement of the latter when actuated by means having connection with an indicator to limit the movement of the latter and thereby indicate the quantity of liquid within the said container.

It is also an object of the invention to provide a gauge of the character indicated of a novel construction in which the float lever in its normal position is adapted to limit the extent of movement of an indicator whereby the amount of liquid in the container may be indicated.

Another object is to provide a gauge which shall be easier to manufacture and install.

Another object is to provide a very simple form of indicator for such gauges.

I attain these objects by the means illustrated in the accompanying drawing and in which,—

Fig. 1 is an isometric view of the indicator as it appears when taking a reading and shows the tank ⅜ full.

Fig. 2 is an isometric view of the part of the gauge in the tank with all parts in the positions which obtain when the knob 1, Fig. 1, is in against the escutcheon and the float is shown in the position it assumes when the tank is nearly empty.

Fig. 3 is a side view of part of Fig. 1.

In Fig. 1 the knob 1 is attached to the bar 2 on which are graduations from "0" to "Full" showing fractions of a tankfull. The bar 2 passes thru the opening 3 in the escutcheon 4 which is attached to the dash or elsewhere by means of the screws or bolts 5. Rigidly attached to the escutcheon 4 by means of the rivet 6 is the bracket 7 on which rides the clip 8 which is attached to the bar 2 and which forms a guide for the rear end of said bar. Attached to the other end of said bracket 7 by means of the screws 9 are the split blocks 10 between which the tube 11 is clamped and this tube extends to the tank. The wire 12 passes inside of this tube and is clamped to the bar 2 by means of the block 13 and the screw 14. The wire 12 passes into the tank and terminates in the loop 15, Fig. 2, which hooks into the opening 16 in the lever 17 which is pivoted to the leg 18 at the point 19. The lever 17 may be referred to and identified, for purposes of description, as a reading lever. The upper end of the leg 18 is rigidly attached to the disc 20 by the rivets 21 and the disc 20 is mounted to the top of the tank and has rigidly attached to it the end of the tube 11 as shown.

Pivoted to the leg 18 by the pin 22 is the float lever 23 the end of which terminates in a flat lip or edge 24 which lies in the path of the lever 17. Rigidly attached to the float lever 23 is the wire 25 to which is pivoted the float 26, said wire passing thru the tube 27 which forms a bearing for the wire in the float.

The lever 17 is provided with teeth 28 which contact with the edge 24 of the float lever 23 when the gauge is read. These teeth prevent said float lever from slipping along the lever 17 at such times.

The float 26 is absolutely free to float on the gasoline as the lever 23 is pivoted loosely on the pin 22 and when the tank is empty the edge 24 is opposite the punch mark 29 on the lever 17, thus the float lever 23 describes an arc about the point 22 such that the edge 24 is always in the path of some of the teeth 28 and limited between the points 29 and 30. When the edge 24 is up in the path of the tooth 30, the lever 17 is capable of its maximum motion.

In using the device to ascertain the height of a liquid in a container, the knob 1 is pulled outwardly, which causes the wire 12, to which it is attached, to move in a like direction. The inner end of said wire is connected to the outer end of a lever 17. Consequently, outward movement thereof causes the said lever to rotate about the pivot 19 until one of the teeth 28 thereon contacts with the edge 24 of the lever 23. Upon contact of the lever 17 with the edge 24 further outward movement of the knob 1 and the wire 12 is prevented. The amount of possible rotation of the lever 17 depends upon the position of the float lever 23 and when the tank is empty the edge 24 is opposite the punch mark 29 as explained. If the knob 1 is pulled out at this time the bar 2 will come out to where the "0" shows in the opening 3 and if the tank is full the edge 24 is in the path of the last tooth 30 and the bar will come out to where the letter "F" shows in the opening if the gauge is operated at this time. The same is true for intermediate positions of the float. Normally the knob 1 is in against the escutcheon 4, and it normally remains in this position because of the friction of the wire 12 in the tube 11, at which time the lever 17 is in the position shown in Fig. 2 clear of the end 24 of the lever 23.

In the construction as shown, the teeth 28 on the lever 17 are arranged in a straight line. In other words, the upper edge of the forward portion of the lever 17 is straight, but it may be of any contour found to be necessary in operation.

It will be seen that by my invention I have provided a construction simple in character, by the employment of which the amount of liquid in a container may be ascertained readily by a person located at a remote point from the container.

I claim:

1. In a liquid level indicator the combination of a pivoted float positioned lever provided with a stop edge parallel to said pivot, the position of said edge being determined by the height of said liquid; a reading lever pivoted so as to swing in a plane transverse to said stop edge, the possible motion of said reading lever being limited by its engagement with said stop edge and means for operating said reading lever and indicating its position when arrested by said stop edge to show the height of said liquid as determined by the position of said float lever.

2. A gauge for ascertaining the amount of liquid in a container comprising, in combination, a support adapted to be mounted within the container, a float positioned lever pivoted at one end to said support, a reading lever pivoted at one end to said support at a point a distance below the pivot of the said float lever, the said levers extending transversely of each other and the said float lever being provided with means for limiting the movement of said reading lever in one direction, and a reciprocable indicating means having connection with the other end of said reading lever for causing pivotal movement of said reading lever in one direction when the said indicator is moved outwardly, the movement of said reading lever being limited by the said means upon the said float positioned lever.

3. A gauge for ascertaining the amount of liquid in a container comprising, in combination, a support adapted to be mounted within the container, a lever pivoted at one end to said support, said lever being provided with a float at its other end whereby the position of said lever is determined by the amount of liquid within the said container, a reading lever pivoted at one end to said support at a point below the pivot of the said float positioned lever, the said reading lever extending upwardly and outwardly in transverse relation to the said float positioned lever, the latter lever being provided with means for limiting the upward movement of the said reading lever, a reciprocable indicator for indicating the amount of liquid within the said container, and a connection between the said indicator and the other end of the said reading lever whereby upon outward movement of the said indicator upward movement of the said reading lever is effected to cause contact thereof with the means upon the said float positioned lever to limit the movement of the said reading lever, substantially as described.

4. Apparatus for indicating the liquid level in a receptacle, said apparatus comprising a pair of relatively movable members, one of said members having a series of teeth, a tooth-engaging detent element on the other member, said detent element extending transversely of the path of movement of the toothed member whereby to limit movement of the latter, a float attached to the detent carrying member for moving the latter in accordance with variations in liquid level in the receptacle, said detent carrying member being normally free to rise and fall, an indicator, and substantially inextensible means connecting the toothed member and indicator.

5. Apparatus for indicating the liquid level in a container, said apparatus comprising an indicator remote from the container, two swinging members one of which is normally free to rise and fall with variations in liquid level in the container and is provided with means whereby it is controlled by the liquid to so rise and fall, and means connected to said normally free member for positively limiting the movement of the other swinging member, means connecting said last named member with the indicator whereby the movement of the indicator will be also limited at the instant of taking a reading of the indicator.

6. Apparatus for indicating the liquid level in a container, said apparatus comprising an indicator remote from the container, a movable member which is normally free to rise and fall with variations in liquid level in the container said member being provided with means whereby it is controlled by the liquid to so rise and fall, a reading device, connections for transmitting movement between the indicator and reading device, movement of the reading device in one direction exerting a component of force tending to move said movable member, and cooperable locking elements on said reading device adapted to oppose such component of force thereby preventing movement of the movable member by actuation of the reading device.

7. In a liquid level indicator, the combination of a pair of members pivotally attached to suitable supporting means and movable in intersecting arcuate paths, one of said members being normally free to position itself according to the liquid level, an indicator, and connecting means between the indicator and the other of said members whereby said last named member and said indicator move synchonously and the level of said liquid is shown on said indicator when said members contact at the points of intersection of the paths of said members corresponding to the instant liquid level.

8. Apparatus for indicating the liquid level in a container, said apparatus comprising a float which is normally free to move in accordance with variations in liquid level in the container, a stop element which swings about a pivot, said element being constructed and arranged to be positioned by said float, a movably mounted reading member normally out of contact with said stop element and movable in such a plane that it may contact with said stop element in any of its possible positions, and means for indicating the liquid level as determined by said float when said reading member is brought against said stop element.

9. A gauge for ascertaining the amount of liquid in a container comprising, in combination, a support adapted to be mounted within the container, a float positioned lever pivoted at one end to said support, a reading lever pivoted at one end to said support at a point a distance from the pivot of the said float lever, the said levers extending transversely of each other and the said float lever being provided with means for limiting the movement of said reading lever in one direction, and a reciprocable indicating means having connection with the other end of said reading lever for causing pivotal movement of said reading lever in one direction when the said indicator is moved outwardly, the movement of said reading lever being limited by the said means upon the said float positioned lever.

ANDREW KING.